United States Patent [19] [11] Patent Number: 4,848,464
Jennings, Jr. et al. [45] Date of Patent: Jul. 18, 1989

[54] METHOD TO IMPROVE USE OF POLYMERS FOR INJECTIVITY PROFILE CONTROL IN ENHANCED OIL RECOVERY

[75] Inventors: Alfred R. Jennings, Jr., Plano; Mark L. Hoefner, Dallas, both of Tex.

[73] Assignee: Mobil Oil Corp., New York, N.Y.

[21] Appl. No.: 197,490

[22] Filed: May 23, 1988

[51] Int. Cl.⁴ .................. E21B 33/138; E21B 43/20
[52] U.S. Cl. .................. 166/270; 166/273; 166/281; 166/294; 166/295
[58] Field of Search ............ 166/270, 273, 281, 294, 166/295, 300

[56] References Cited

U.S. PATENT DOCUMENTS 2,728,395 12/1955 Howard .................. 166/294 X
3,227,212 1/1966 Black et al. .................. 166/294
3,516,496 6/1970 Barkman, Jr. et al. .......... 166/281
4,157,116 6/1979 Coulter .................. 166/294 X
4,237,975 12/1980 Scherubel .................. 166/281
4,378,049 3/1983 Hsu et al. .................. 166/294 X
4,601,339 7/1986 Jennings, Jr. .................. 166/281
4,735,265 4/1988 Hoskin et al. .................. 166/270 X
4,750,562 6/1988 Jennings, Jr. .................. 166/281

Primary Examiner—George A. Suchfield
Attorney, Agent, or Firm—Alexander J. McKillop; Charles J. Speciale; Charles A. Malone

[57] ABSTRACT

A method for minimizing blockage in a zone of lesser permeability when injecting gels into a formation during profile control. A solidifiable gel containing a gel breaker is injected into the formation where it enters a zone of lesser and a zone of greater permeability. Said gel blocks pores in the zone of lesser permeability. Another solidifiable gel lacking a gel breaker is injected into the zone of greater permeability where it subsequently solidifies. Said gel contained in the zone of lesser permeability liquefies thereby unblocking this zone. Afterwards, a water-flooding enhanced oil recovery method is directed into the zone of lesser permeability.

18 Claims, 1 Drawing Sheet 4,848,464

METHOD TO IMPROVE USE OF POLYMERS FOR INJECTIVITY PROFILE CONTROL IN ENHANCED OIL RECOVERY

FIELD OF THE INVENTION

This invention relates to a process for recovering oil from a subterranean oil-containing formation. More particularly, this invention relates to a method of recovering oil wherein zones of varying permeabilities are treated with different polymers.

BACKGROUND OF THE INVENTION

When hydrocarbon producing wells are drilled, initial hydrocarbon production is usually attained by natural drive mechanisms (water drive, solution gas, or gas cap, e.g.) which force the hydrocarbons into the producing wellbores. If a hydrocarbon reservoir lacks sufficient pore pressure (as imparted by natural drive), to allow natural pressure-driven production, artificial lift methods (pump or gas lift, e.g.) are used to produce the hydrocarbon.

As a large part of the reservoir energy may be spent during the initial (or "primary") production, it is frequently necessary to use secondary hydrocarbon production methods to produce the large quantities of hydrocarbons remaining in the reservoir. Waterflooding is a widespread technique for recovering additional hydrocarbon and usually involves an entire oil or gas field. Water is injected through certain injection wells selected based on a desired flood pattern and on lithology and geological deposition of the pay interval. Displaced oil is then produced into producing wells in the field.

Advancements in secondary hydrocarbon producing technology has led to several improvements in waterflood techniques. For example, the viscosity of the injected water can be increased using certain polymer viscosifiers (such as polyacrylamides, polysaccharides, and biopolymers) to improve the 'sweep efficiency' of the injected fluid. This results in greater displacement of hydrocarbon from the reservoir.

Ability to displace oil from all the producing intervals in a hydrocarbon reservoir is limited by the lithological stratification of the reservoir. That is, there are variations in permeability which allow the higher permeability zones to the swept with injected fluid first and leave a major part of the hydrocarbon saturation in the lower permeability intervals in place. Continued injection of flooding fluid results in 'breakthrough' at the producing wells at the high permeability intervals which renders continued injection of the flooding medium uneconomical.

Profile control has been used to prevent or correct "breakthrough" at high permeability intervals. Profile control involves using stable polymers to retard or, in some cases, block off the higher permeability intervals in a mature flood so that the flooding media is diverted to the lower permeability intervals. Field experience has indicated profile control can be used to enhance productivity from lower permeability intervals.

To impart profile control, specially developed polymers (such as copolymers and polysaccharides) are used to retard permeability of higher permeability intervals. However, permeability damage is imparted to the low permeability zone while the profile control material is being used to treat the high permeability interval(s).

Although fluid entry into the low permeability zone is retarded by the profile control polymer, laboratory tests indicate a filter cake build-up at the formation interface and a limited depth of damage.

Therefore, what is needed is a profile control method wherein a high permeability zone can be closed to fluid flow while minimizing damage to a low permeability zone.

SUMMARY OF THE INVENTION

This invention is directed to a method of profile control where damage to a formation's ower zone of permeability is minimized. A spacer volume of fluid comprising a solidifiable gel containing a gel breaker is pumped into the formation. Said gel enters a zone of greater permeability and intermixes with a filter cake build up at the formation interface of said lower permeability zone. Thereafter, a solidifiable gel lacking a gel breaker is pumped into the formation where it enters a zone of greater permeability. Said solidifiable gel lacking the gel breaker is precluded entry into said lower permeability zone, without use of a mechanical packer. It solidifies in the zone of higher permeability and makes a firm gel.

The injection well through which said gels were pumped is shut-in. After being shut-in for a brief period, the gel breaks in said filter cake build up, the low permeability zone, and flows therefrom. An enhanced oil recovery process, e.g. a water flood, is directed into the zone of lesser permeability for the recovery of hydrocarbonaceous fluids.

It is therefore an object of this invention to minimize damage to a lower permeability zone when a gel is used for profile control.

It is another object of this invention to provide a method to easily reopen a zone of lower permeability when a gel is utilized.

It is a still another object of this invention to obtain a greater recovery of hydrocarbonaceous fluids from a zone of lesser permeability after a profile control treatment.

It is yet another object of this invention to provide a method for removing filter cake build up at a formation interface.

It is a still yet further object of this invention to limit the depth of damage caused by a profile control polymer.

DESCRIPTION OF THE PREFERRED EMBODIMENTS

Figure 1:
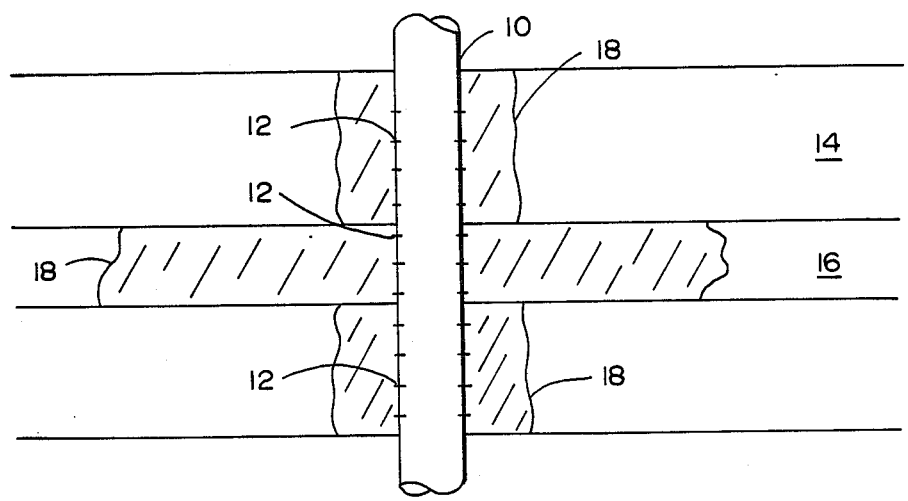
FIG. 1 is a sectional view of a formation containing a wellbore depicting entry of a profile control polymer into zones of greater and lesser permeabilities with resultant damage to the lower permeability zone.

As is shown in FIG. 1, damage often occurs to a lower permeability zone 14 when a profile control gel 18 lacking a gel breaker is pumped down wellbore 10 into a higher permeability zone 16. Prior to a filter cake build up, some profile control gel 18 lacking a gel breaker enters lower permeability zone 14 thereby preventing a flooding fluid from entering into zone 14. Since a flooding fluid can't enter into all or portions of zone 14, valuable hydrocarbonaceous fluids may not be recovered.

Figure 2:
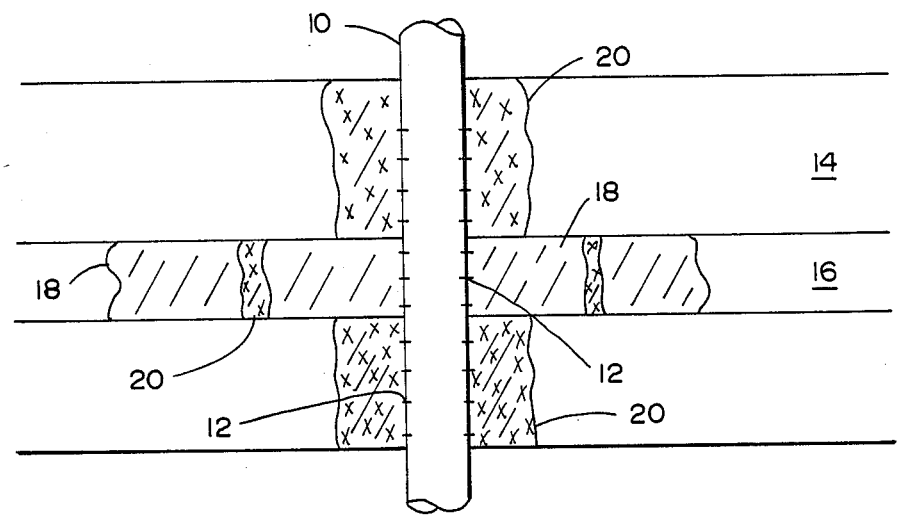
FIG. 2 is a sectional view of a formation containing a wellbore depicting placement of a profile control gel containing a gel breaker into zones of greater and lesser permeabilities. Placement of a profile control gel lacking a gel breaker is also depicted.

In the practice of this invention, referring to FIG. 2, a "spacer volume" amount of a solidifiable gel containing a gel breaker is pumped down wellbore 10 where it enters via perforations 12 a zone of higher permeability 16. As this solidifiable gel containing said gel breaker is pumped into wellbore 10 a filter cake builds upon the face of the lower permeability zone of the formation. Some of the solidifiable gel containing said breaker passes through the filter cake and enters the lower permeability zone 14. The filter cake build up is caused by crosslinked polymer inherent to the solidifiable gel. Undissolved material in said solidifiable gel containing a gel breaker, such as polymer residue, material from inside the wellbore, and other extraneous residue also contribute to the formation of the filter cake.

After the "spacer volume" of solidifiable pumpable gel containing said gel breaker has been used up, some of it will remain incorporated into the filter cake which has formed on the formation face of lower permeability zone 14. During the pumping of the solidifiable gel containing the gel breaker 20 into lower permeability zone 14, the filter cake will become less permeable until substantially none of said gel enters lower permeability zone 14. Although some of gel containing the breaker will enter or invade higher permeability zone 16, the volume of the spacer volume of gel will be selected so as to minimize its entry into higher permeability zone 16.

Now that a lower permeability zone 14 has been effectively closed to fluid entry therein, another pumpable solidifiable gel solution lacking a gel breaker is pumped into wellbore 10 where via perforations 12 this gel enters a higher permeability zone 16 or zones. When this gel lacking said breaker enters a higher permeability zone 16, it forces gel containing a gel breaker ahead of it to a greater depth into higher permeability zone 16. After pumping a desired amount of gel lacking a breaker into a higher permeability zone 16, this gel forms a solid firm gel. After a desired time interval wellbore 10 is shut in and any skin on the low interval will break or liquify. Similarly, the filter cake on the formation face of lower permeability zone 14 will also break and liquify, as well as any of the gel containing a breaker which entered lower permeability zone 14. Thus, lower permeability zone 14 will be open and receptive to an enhanced oil recovery method such as a waterflood. Higher permeability zone 16 remains closed with said solid gel thus precluding entry of a waterflood therein.

A waterflooding process which can be utilized herein after breaking of the gel in the skin, filter cake, and lower permeability zone 14 is described in U.S. Pat. No. 4,479,984 which issued to Chen et al. This patent is hereby incorporated by reference in its entirety. Utilization of this process removes hydrocarbonaceous fluids from a lower zone of permeability 14. Solidifiable gel mixtures lacking a gel breaker which can work in the present invention are selected to withstand conditions encountered in the formation. As will be understood by those skilled in the art, the composition of the mixture can be varied to obtain the desired rigidity in the gel composition. One method of making a suitable, compatible mixture is discussed in U.S. Pat. No. 4,333,461 which issued to Muller on June 8, 1982 and which is hereby incorporated by reference. The stability and rigidity of the selected gel will depend upon the physical and chemical characteristics of the gel which are dictated by conditions in the formation. As is known to those skilled in the art, the solidified gel should be generally of a stability and rigidity which will absorb the heat and pressures encountered in a formation. Generally, the pressures encountered in a formation will vary from about 1,000 psig to about 20,000 psig. Heat encountered in a formation will generally vary from about 60° to about 450° F.

Other gel mixtures can be used to obtain the desired stability and rigidity. A preferred mixture used to obtain the desired stability and rigidity, for example, is a mixture of hydropropyl guar gum cross-linked with transitional metals and ions thereof. The purpose of the transitional metal ions is to provide increased strength, stability and rigidity for the solidifiable gel. These gel mixtures are discussed in U.S. Pat. No. 4,664,191 which issued to A. R. Jennings, Jr. on May 12, 1987. This patent is hereby incorporated by reference herein.

Hydropropyl guar gum is placed into the gel mixture in an amount of from about 0.70 to about 10.0 weight percent of said mixture. As is preferred, hydropropyl guar is placed in said mixture in about 7.2 percent by weight of said mixture.

Metallic ions which can be used in the pumpable gel mixture include titanium, zirconium, chromium, antimony and aluminum. The concentration of these transitional metals in the pumpable solidifiable gel fluid will of course vary depending upon the requirements for the particular formation being treated. Although the exact amounts of the metals required will vary depending on the particular application, it is anticipated that the metals should be included within the pumpable gel fluid in amounts of from about 0.005 weight percent to about 0.50 weight percent, preferably about 0.01 weight percent of said fluid.

In order to obtain a solidifiable gel for pumping into lower permeability zone 14, a gel breaker is placed in the solidifiable gel prior to injecting the gel into the formation. This gel breaker, included in the gel mixture, is selected from a group of chemicals which can break down the solid gel at temperatures of less than from about 60° F. to about 250° F. Generally this breakdown will occur within from about 2 hours to about 24 hours depending upon the type and concentration of breaker added. Chemicals satisfactory for use as gel breakers, and which are incorporated into the gel mixture, include enzymes and oxidizing agents, suitable for breaking down the solid gel (such as sodium persulfate). Other gel breakers sufficient for this purpose are discussed in U.S. Pat. No. 4,265,311 issued to Ely on May 5, 1981, which patent is hereby incorporated by reference. These chemicals are readily available from chemical suppliers and with the exception of enzyme breakers are sold under their chemical names. Enzyme breakers can be obtained from oil field service companies. The concentration of the gel breaker incorporated into the gel mixture will vary from about 0.01 weight percent to about 0.10 weight percent, preferably about 0.05 weight percent of the gel mixture. Upon cooling to a temperature of from about 60° F. to about 150° F., the gel breaker will breakdown the solid gel in zone 14 causing it to liquify and flow from the formation. It will also break down the filter cake.

In one example of the practice of this invention, a slurry is formed with 1,000 gallons of water. This slurry comprises about 40 pounds of base gel such as hydroxypropyl guar gum which forms a gel in the water. To this mixture is added about 600 pounds of chemically treated hydroxypropyl guar gum which has delayed hydration or thickening qualities. Approximately 20 pounds of a buffer or catalyst suitable to obtain the desired pH and reaction time is added to this mixture. A sodium pyrophosphate buffer is suitable for this purpose. Cross-linking agents, such as borates and chromates, are then added in an amount of about 20 pounds. Sodium tetra-borate is suitable for this purpose and preferred. This gel mixture is pumped into the casing of well 10 as shown in FIG. 2. After solidification of the mixture, any undesired solidified gel in the wellbore 10 can be removed by contacting it with 15 volume percent of hydrochloric acid in an amount sufficient to solubilize said gel after completion of the waterflood.

As is understood by those skilled in the art, the composition of a selected gel will depend upon many variables including formation conditions. The above example is mentioned as one possible variation among many others.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

What is claimed is:

1. A method for minimizing formation damage when placing a profile control gel into a formation having varying zones of permeability comprising:
   (a) injecting a solidifiable gel containing a gel breaker into a formation where said gel enters a zone of greater permeability and a zone of lesser permeability without use of a mechanical packer thereby blocking said lesser permeability zone as a result of a filter cake build up;
   (b) injecting thereafter another solidifiable gel lacking a gel breaker into the formation which solution enters said greater permeability zone thereby forcing gel containing said gel breaker deeper into said greater permeability zone;
   (c) allowing both gels to solidify in the lesser and higher permeability zones;
   (d) causing the solidified gel containing a gel breaker to liquefy thereby unblocking said lesser permeability zone to fluid flow;
   (e) initiating a waterflooding enhanced oil recovery method in the zone of lesser permeability and removing hydrocarbonaceous fluids therefrom.

2. The method as recited in claim 1 where the gel in steps (a) and (b) comprises hydroxypropyl guar gum.

3. The method as recited in claim 1 where said gels are injected into said formation by at least one injection well.

4. The method as recited in claim 1 where the gel in step (a) comprises hydroxypropyl guar gum and a gel breaker in an amount of from about 0.01 to about 0.10 weight percent.

5. The method as recited in claim 1 where said gel in step (a) forms a filter cake on the formation face of said lesser permeability zone.

6. The method as recited in claim 1 where hydrocarbonaceous fluids are removed by at least one production well.

7. The method as recited in claim 1 where said gel in step (a) breaks down within from about 2 to about 24 hours at temperatures of from about 60° F. to about 250° f.

8. The method as recited in claim 1 where in step (b) said gel comprises a solidifiable gel mixture which forms a solid sufficient to withstand pressures of from about 1,000 psig to about 20,000 psig.

9. The method as recited in claim 1 where in step (b) said gel comprises a solidifiable gel mixture which forms a solid able to withstand temperatures greater than about 1,000° F.

10. The method as recited in claim 1 where in step (b) said gel comprises a solidifiable gel mixture which becomes solid and is made thermally stable for temperatures of from about 350° F. to about 450° F. for from about 0.5 of a day to about 4 days.

11. A method for minimizing formation damage when placing a profile control gel into a formation having varying zones of permeability comprising:
   (a) injecting a solidifiable gel containing a gel breaker into a formation where said gel enters a zone of greater permeability without use of a mechanical packer thereby blocking said lesser permeability zone as a result of a filter cake build up;
   (b) injecting thereafter another solidifiable gel lacking a gel breaker into the formation which solution enters said greater permeability zone thereby forcing gel containing said gel breaker deeper into said greater permeability zone;
   (c) allowing both gels to solidify in the lesser and higher permeability zones; and
   (d) causing the solidified gel containing a gel breaker to liquefy thereby unblocking said lesser permeability zone to fluid flow.

12. The method as recited in claim 11 where the gel in steps (a) and (b) comprises hydroxypropyl guar gum.

13. The method as recited in claim 11 where the gel in step (a) comprises hydroxypropyl guar gum and a gel breaker in an amount of from about 0.01 to about 0.10 weight percent.

14. The method as recited in claim 11 where said gel in step (a) forms a filter cake on the formation face of said lesser permeability zone.

15. The method as recited in claim 11 where said gel in step (a) breaks down within from about 2 to about 24 hours at temperatures of from about 60° F. to about 250° F.

16. The method as recited in claim 11 where in step (b) said gel comprises a solidifiable gel mixture which forms a solid sufficient to withstand pressures of from about 1,000 psig to about 20,000 psig.

17. The method as recited in claim 11 where in step (b) said gel comprises a solidifiable gel mixture which forms a solid able to withstand temperatures greater than about 1,000° F.

18. The method as recited in claim 11 where in step (b) said gel comprises a solidifiable gel mixture which becomes solid and is made thermally stable for temperatures of from about 350° F. to about 450° F. for from about 0.5 of a day to about 4 days.

* * * * *